US006969747B2

(12) United States Patent
Bhaduri et al.

(10) Patent No.: US 6,969,747 B2
(45) Date of Patent: Nov. 29, 2005

(54) OLEFIN POLYMERIZATION TITANIUM CATALYST

(75) Inventors: Sumit Bhaduri, Maharashtra (IN); Virendra Kumar Gupta, Maharashtra (IN)

(73) Assignee: Reliance Industries Limited, Maharashtra (IN)

( * ) Notice: Subject to any disclaimer, the term of this patent is extended or adjusted under 35 U.S.C. 154(b) by 72 days.

(21) Appl. No.: 10/502,219

(22) PCT Filed: Jan. 25, 2002

(86) PCT No.: PCT/IN02/00015

§ 371 (c)(1),
(2), (4) Date: Jul. 21, 2004

(87) PCT Pub. No.: WO03/062283

PCT Pub. Date: Jul. 31, 2003

(65) Prior Publication Data

US 2005/0113537 A1  May 26, 2005

(51) Int. Cl.[7] .............................................. C08F 4/649
(52) U.S. Cl. ...................... 526/140; 526/225; 526/904; 502/109; 502/122
(58) Field of Search ............................... 526/140, 225, 526/904; 502/109, 122

(56) References Cited

U.S. PATENT DOCUMENTS

| 473,268 | A | | 4/1892 | Sloan |
| 4,182,810 | A | | 1/1980 | Willcox |
| 4,329,253 | A | | 5/1982 | Goodall et al. |
| 4,330,649 | A | | 5/1982 | Kioka et al. |
| 4,354,010 | A | * | 10/1982 | Newton ..................... 502/105 |
| 4,393,182 | A | | 7/1983 | Goodall et al. |
| 4,400,302 | A | | 8/1983 | Goodall et al. |
| 4,414,132 | A | | 11/1983 | Goodall et al. |
| 4,472,521 | A | | 9/1984 | Band |
| 4,535,068 | A | | 8/1985 | Job |
| 4,540,679 | A | | 9/1985 | Arzoumanidis et al. |
| 4,710,428 | A | | 12/1987 | Tamamizu et al. |
| 4,728,705 | A | | 3/1988 | Nestlerode et al. |
| 4,808,561 | A | | 2/1989 | Welborn, Jr. |
| 4,900,706 | A | | 2/1990 | Sasaki et al. |
| 4,921,825 | A | | 5/1990 | Kioka et al. |
| 5,106,806 | A | | 4/1992 | Job |
| 5,122,494 | A | | 6/1992 | Job |
| 5,281,567 | A | | 1/1994 | Job |
| 5,362,824 | A | | 11/1994 | Furtek et al. |
| 5,461,017 | A | | 10/1995 | Furtek et al. |

FOREIGN PATENT DOCUMENTS

| EP | 0177622 | 4/1986 |
| RU | 465819 | 6/1978 |
| RU | 682262 | 8/1979 |
| WO | WO 01/18067 | 3/2001 |

OTHER PUBLICATIONS

S. M. Pillai, et al., *Dimerization of Ethylene and Propylene Catalyzed by Transition-Metal Complexes*, Chem. Rev. 1986, 88, 353-399.

J.A. Gladysz, *Frontiers in Metal-Catalyzed Polymerization: Designer Metallocenes, Designs on New Monomers, Demystifying MAO, Methathesis Deshabille*, Chem. Rev. 2000, vol. 100, No. 4.

H.G. Alt, *Effect of the Nature of Metallocene Complexes of Group IV Metals on Their Performance in Catalytic Ethylene and Propylene Polymerization*, Chem. Rev. 2000, 100, 1205-1221.

H.G. Alt, *The heterogenization of homogenous metallocene catalystys for olefin polymerization*, J. Chem. Soc., 1999, 1703-1709.

G.G. Hlatky, *Heterogeneous Single-Site Catalysts for Olefin Polymerization*, Chem. Rev. 2000, 100, 1347-1376.

* cited by examiner

*Primary Examiner*—Fred Teskin
(74) *Attorney, Agent, or Firm*—Knobbe, Martens, Olson & Bear, LLP

(57) ABSTRACT

An olefin polymerization titanium catalyst. It comprises a titanium compound and an organoaluminium compound cocatalyst supported on a soluble polysulfone comprising free reactive sulfone groups. The molar ratio of titanium of aluminum is 1–10:200 and the weight ratio of titanium to polysulfone is 0.01–0.1:0.3–2.5. The process for preparing the catalyst comprises preparing a supported titanium compound by contacting a solution of a polysulfone in a halogenated or polar solvent with a titanium compound or a solution thereof in a halogenated or polar solvent in an inert atmosphere at a temperature between 10° C. and the boiling point of the solvent such that the weight ratio of titanium to polysulfone is 0.01–0.1:0.3–2.5. The supported titanium compound is mixed with an organoaluminium cocatalyst such that the molar ratio of titanium to aluminum is 1–10:200.

33 Claims, No Drawings

OLEFIN POLYMERIZATION TITANIUM CATALYST

This application is the U.S. national phase under 35 U.S.C. § 371 of International Application No. PCT/IN02/00015, filed Jan. 25, 2002.

FIELD OF THE INVENTION

This invention relates to an olefin polymerisation titanium catalyst, a process for the preparation thereof and a process for the polymerisation of an olefin employing the catalyst.

PRIOR ART

Polymers of olefins especially lower olefins or α-alkenes such as ethylene, propylene or 1-butene are important materials because of their substantial commercial use in the manufacture of a variety of articles including plastic bags, sheets or automobile parts. The polymerisation of these alkenes has been widely practised for decades and involves the reaction of lower α-alkene such as ethylene with a catalyst under polymerisation conditions.

In commercial lower α-alkene polymerisation, solid heterogenous catalysts comprising magnesium dichloride supported titanium catalysts are predominantly used. One method for preparation of these catalysts comprises halogenation of an organo magnesium compound like magnesium alkoxide with or without titanium followed by treatment with titanium compound like titanium tetrachloride. A second method for preparation of these catalysts involves reaction of magnesium dichloride and a titanium compound (U.S. Pat. Nos. 4,329,253, 4,393,182, 4,400,302, 4,414,132, 4,535,068, 4,330,649, 4,472,521, 4,540,679, 4,728,705, 4,710,428, 5,106,806, 5,122,494 and 5,281,567). In the first method the halogenating agent usually used is titanium tetrachloride itself. Therefore, this method consumes considerably large amount of titanium tetrachloride based no the final titanium content in the catalyst and is not economical. Another disadvantage of use of organomagnesium compound like magnesium alkoxide is that during the catalyst synthesis species other than titanium tetrachloride is produced. For propylene polymerisation, this necessitates further treatment of the catalyst with a halogenating agent to achieve a desirable level of catalytic activity. Here again, the use of excess halogenating agent is not economical. In the second method special techniques like ball milling are used. Therefore, the catalyst formed is a physical mixture of titanium and magnesium compounds where the bonding between the particles may not be good thereby adversely affecting the catalytic activity. While these disadvantages may be overcome by using activated anhydrous magnesium dichloride as starting material, in order to obtain catalyst of optimum particles size or morphology, additional preparative steps such as spray drying or melting are required, which make the process time consuming, inconvenient, and uneconomical. U.S. Pat. No. 4,900,706 discloses a catalyst comprising titanium, magnesium and chlorine deposited on an organic polymer support like styrene-divinyl benzene copolymer. However, in this case also because of the use of an organomagnesium precursor, a final treatment with titanium tetrachloride is required to give a catalytically active component.

Various organic polymers have been used as support material for titanium or vanadium halide and aluminium alkyl based polymerisation catalysts. In USSR Author's Certificate No 682262, non-metallocene catalysts based on titanium halides supported on polyethylene or polypropylene particles having substantially inert surfaces or copolymer of ethylene and vinyl alcohol having active surface hydroxyl groups are described. Both these support materials have been reported to show low activity or easy leaching of the catalyst. USSR Author's Certificate No 465819 describes use of homopolymers of styrene and copolymers thereof with divinyl benzene as support for vanadium or titanium tetrahalide. The aromatic rings of the organic polymer are believed to reduce vanadium/titanium tetrahalide to a solid phase of the corresponding trihalide which remains trapped within the pores and on the surface of the support to provide an active catalyst. These supports are not suitable for use in the case of titanium and/or vanadium alkoxides and/or halo alkoxides. These compounds are reported to be active ethylene polymerisation catalysts (S M Pillai, M Ravindranathan and S Sivram, Chemical Review, 1986, 86, 353).

Metallocene and other single site catalysts are highly selective and result in polymers of very narrow molecular weight distribution (J A Gladysz, Chemical Review, 2000, 100, 1167; H G Alt and A Koppl, Chemical Review, 2000, 100, 1205). During the synthesis of these catalysts, a thick polymer coating is reported to be formed on the polymerisation reactor wall and its stirrer which adversely affects the heat transfer characteristics of the catalytic system (H G Alt, J. Chem. Soc., Dalton Trans, 1999, 1703). Besides, unless anchored on a solid support these catalysts cannot be efficiently used in a number of commercial reactors. To overcome the above drawbacks and also in an attempt to produce polymers with a bimodal distribution of molecular weight as is usually desirable in the case of polyethylene catalyst comprising metallocenes or other single site catalysts and/or aluminoxane cocatalysts supported on an inorganic carrier like silica or an organic carrier like resinous polyethylene, polypropylene, crosslinked copolymer of divinyl benzene, styrene and acetoxy/hydroxy styrene, polyvinyl chloride, polyamide, polycarbonate, acrylonitrile-butadiene-styrene copolymer or polymethylmethacrylate have been developed (U.S. Pat. Nos. 473,268, 4,808,561, 4,921,825, 5,362,824 and 5,461,017 and G G Hlatky, Chemical Review, 2000, 100, 1347). These developments, however, are limited to metallocene and/or aluminoxane cocatalysts only.

Particle size distribution of a solid catalyst used for polymerisation determines the properties of the resultant polymer. These properties of the polymer in turn determine the throughput in the polymerisation plant as well as the ease with which the polymer is processed. Particle size distribution of a solid catalyst is therefore an important feature. However, in the above mentioned catalyst, one disadvantage is that, only by starting with a support or carrier material of predefined particle size, the particle size of the support catalysts may be controlled.

OBJECTS OF INVENTION

An object of the invention is to provide an olefin polymerisation titanium catalyst, which shows good activity.

Another object of the invention is to provide an olefin polymerisation titanium catalyst, which is devoid of magnesium support and eliminates drawbacks associated therewith.

Another object of the invention is to provide an olefin polymerisation titanium catalyst, which is simple and easy to make and is economical.

Another object of the invention is to provide a process for the operation of an olefin polymerisation titanium catalyst which is simple and convenient to carry out besides being economical.

Another object of the invention is to provide a process for the preparation of an olefin polymerisation titanium catalyst, which shows good activity.

Another object of the invention is to provide a process for the preparation of an olefin polymerisation titanium catalyst, which is devoid of magnesium support and eliminates drawbacks associated therewith.

Another object of the invention is to provide a process for the polymerisation of olefin employing the titanium catalyst, which is very efficient.

DESCRIPTION OF INVENTION

According to the invention there is provided an olefin polymerisation titanium catalyst comprising a titanium compound and an organoaluminium compound cocatalyst supported on a soluble polysulfone comprising free reactive sulfone groups, wherein the molar ratio of titanium to aluminum is 1–10:200 and the weight ratio of titanium to polysulfone is 0.1–0.01:0.3–2.5.

According to the invention there is also provided a process for the preparation of an olefin polymerisation titanium catalyst comprising a titanium compound and an organoaluminium compound cocatalyst supported on a soluble polysulfone comprising free reactive sulfone groups, wherein the molar ratio of titanium to aluminum 1–10:200 and the weight ratio of titanium to polysulfone 0.01–0.1: 0.3–2.5; the process comprising:

a) preparing a supported titanium compound by contacting a solution of a polysulfone in a halogenated or polar solvent with a titanium compound or a solution thereof in a halogenated or polar solvent in an inert atmosphere at a temperature between 10° C. and the boiling point of the solvent, wherein the weight ratio of titanium to polysulfone is 0.01–0.1:0.3–2.5; and b) mixing the supported titanium compound with an organoaluminium cocatalyst such that the molar ratio of titanium to aluminum is 1–10:200.

The precipitated supported titanium compound is separated or filtered out from the reaction mixture of step (a) prior to mixing with the cocatalyst.

According to the invention there is also provided a process for the polymerisation of an olefin employing a titanium catalyst comprising a titanium compound and an organoaluminium compound cocatalyst supported on a soluble polysulfone comprising free reactive sulfone groups, wherein the molar ratio of titanium to aluminum is 1–10:200 and the weight ratio of titanium of polysulfone is 0.01–0.2: 0.3–2.5 the process comprises reacting the olefin with the titanium catalyst under polymerisation conditions in known manner.

The polysulfone support comprising free reactive sulfone groups may be represented by the formula I:

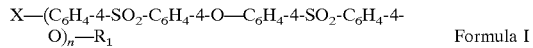

Formula I wherein n has values 10–70, X is halide, $R_1$ is hydrogen or alkyl group. Preferably n=25–50, X=Cl and $R_1$=H or $CH_3$ in the formula I.

The olefin may be a lower α-alkene like ethylene, propylene or 1-butene or mixtures thereof, preferably ethylene.

The titanium compound may be titanium tetrahalide, titanium alkoxohalide or titanium tetraalkoxide, preferably titanium tetrachloride and/or titanium tetrabutoxide.

The organoaluminium compound cocatalyst may be trialkyl or oxoalkyl compound like methyl aluminoxane or triethyl aluminum, preferably methyl aluminoxane.

The molar ratio of titanium to aluminum is preferably 10:200.

The halogenated solvent may be methylene dichloride or 1,2-dichloride preferably methylene dichloride. The polar solvent may be dimethyl sulfoxide or dimethyl formamide, preferably dimethyl formamide.

The supported titanium compound may be prepared in an inert atmosphere provided by nitrogen or argon, preferably argon and at a temperature of, preferably, 20–50° C.

The particle size distribution, degree of titanium incorporation in the catalyst and other physico-chemical properties of the catalyst which determine its performance are controlled by the weight ratio of titanium to polysulfone at the time of contact. Preferably the weight ratio of titanium to polysulfone is 0.04:0.3. The mean particle size of the titanium compound catalyst is 10–100μ, preferably 15–45μ.

The constituents of the polymerisation catalyst may be mixed in a vessel outside the polymerisation reactor and then transferred thereinto. Alternatively they may be mixed together in the reactor to form the catalyst insitu.

The polymerisation of olefins is carried out in known manner using the catalyst of the invention in gas phase employing one or more fluidised beds of the catalyst. Alternatively it may also be conducted in a slurry phase in the presence of an inert hydrocarbon diluent like toluene or hexane.

The reactive free sulfone groups along the catalyst support chemically bond with titanium atoms. Therefore, the titanium atoms are well dispersed and distributed in the catalyst. As a result the catalyst shows high performance or activity in the polymerisation of olefins. Because catalyst does not comprise any magnesium compound it eliminates the use of excess titanium compound as a halogenating agent in its preparation. Also the preparation of this catalyst does away with special techniques like ball milling, spray drying or melting. Further the invention does away with stringent requirement as regards the selection of predetermined particle size distribution for the support to control the particle size distribution of the catalyst as the same is achieved by selecting the titanium to polysulfone ratio at the time of preparing the titanium compound. Besides, handling of the polysulfone in solution is easy and convenient. The process of the invention is very simple, less time consuming and convenient to carry out for the above reasons. The invention is also economical for the above reasons. Due to the high activity of the catalyst polymerisation efficiency is increased.

The following experimental examples are illustrative of the invention but not limitative of the scope thereof.

EXAMPLE 1

To a 100 ml methylene dichloride solution of 5 g of polysulfone (formula I, wherein X=Cl, $R_1$=$CH_3$ and n=25–50) was added 1.7 g of $TiCl_4$ under nitrogen atmosphere and stirred at 25–30° C. for 2 hrs. The yellow solid formed was filtered out. It showed 2.6% titanium incorporation and a mean particle size of D90 137.8μ. The solid (0.5 g) was mixed with 30% methyl aluminoxane (2.2 g) to obtain the catalyst (titanium:aluminum:: 1:100).

Example 2

The procedure of Example 1 was followed except that 5 g of polysulfone (formula I, wherein X=Cl, $R_1$=H and n=25–50) and 8.7 g of $TiCl_4$ were used. The yellow solid (0.5 g) formed showed 10.5% titanium incorporation and a mean particle size of D90 48.5 $\mu$.

Example 3

To a 100 ml methylene dichloride solution of 5 g of polysulfone (formula I, wherein X=Cl, $R_1$=H and n=25–50), was added 1.0 g of Ti $(OBu^n)_4$ under nitrogen atmosphere and stirred at 25–30° C. for 12 hrs. The off-white solid formed was filtered out. It showed 0.2% titanium incorporation and a mean particle size of D90 80.0$\mu$. The solid (0.5 g) was mixed with 30% methyl aluminoxane (2.1 g) to obtain the catalyst (titanium aluminum::1:100).

Example 4

The procedure of Example 3 was followed except that 6.4 g of $Ti(OBU^n)_4$ was used. The off-white solid (0.5 g) formed showed 0.2% titanium incorporation and a mean particle size of D90 59.0$\mu$.

Example 5

The procedure of Example 3 was followed except that 0.85 g of $TiCl_4$ and 0.5 g of $Ti(OBu^n)_4$ were used. The solid (0.5 g) formed showed 1.5% titanium incorporation and a mean particle size of D90 63.5$\mu$.

Example 6

The procedure of Example 1 was followed except that 100 ml of diemthyl formamide was used. The yellow solid (0.5 g) formed showed 2.7% titanium incorporation and a mean particle size of D90 135.2$\mu$.

Examples 7 to 10

The catalysts of Examples 1 to 5 (2.5 g) were used in slurry phase polymerisation of ethylene in toluene (200 ml) at 1 bar pressure and at 25–30° C. The productivities of the polymers were as follows:

| Catalyst | Productivities in kg/mol Ti/h |
|---|---|
| Example 1 | 50 |
| Example 2 | 10 |
| Example 3 | 55 |
| Example 4 | 40 |
| Example 5 | 15 |

The above productivities show the high performance of the catalyst of the invention in the polymerisation of olefins, specially lower α-olefin.

What is claimed is:

1. An olefin polymerisation titanium catalyst comprising a titanium compound and an organoaluminium compound cocatalyst supported on a soluble polysulfone comprising free reactive sulfone groups, wherein the molar ratio of titanium to aluminium is 1–10:200 and the weight ratio of titanium to polysulfone is 0.01–0.1:0.3–2.5.

2. A catalyst as claimed in claim 1, wherein the polysulfone is of the formula 1:

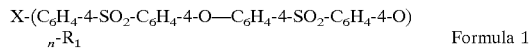

Formula 1 wherein X=Cl, $R_1$=H or $CH_3$ and n=25–50.

3. A catalyst as claimed in claim 1, wherein the olefin is ethylene.

4. A catalyst as claimed in claim 1, wherein the titanium compound is titanium tetrachloride and/or titanium tetrabutoxide.

5. A catalyst as claimed in claim 1, wherein the organoaluminium compound is methyl aluminoxane.

6. A catalyst as claimed in claim 1, wherein the molar ratio of titanium to aluminum 10:200.

7. A catalyst as claimed in claim 1, wherein the weight ratio of titanium to polysulfone is 0.04:0.3.

8. A process for the preparation of an olefin polymerisation titanium catalyst comprising a titanium compound and an organoaluminium compound cocatalyst supported on a soluble polysulfone comprising free reactive sulfone groups, wherein the molar ratio of titanium to aluminum is 1–10:200 and the weight ratio of titanium to polysulfone is 0.01–0.1:0.3–2.5, the process comprising:
 a. preparing a supported titanium compound by contacting a solution of a polysulfone in a halogenated or polar solvent with a titanium compound or a solution thereof in a halogenated or polar solvent in an inert atmosphere at a temperature between 10° C and the boiling point of the solvent, wherein the weight ratio of titanium to polysulfone is 0.01–0.1:0.3–2.5; and
 b. mixing the supported titanium compound with an organoaluminium cocatalyst such that the molar ratio of titanium to aluminium is 1–10:200.

9. A process as claimed in claim 8, wherein the polysulfone is of the formula 1:

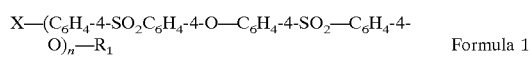

Formula 1 wherein X=Cl, $R_1$=H or $CH_3$ and n=25-50.

10. A process as claimed in claim 8, wherein the olefin is ethylene.

11. A process as claimed in claim 8, wherein the titanium compound is titanium tetrachloride and/or titanium tetrabutoxide.

12. A process as claimed in claim 8, wherein the organoaluminium compound is methyl aluminoxane.

13. A process as claimed in claim 8, wherein the molar ratio of titanium to aluminium is 10:200.

14. A process as claimed in claim 8, wherein the halogenated solvent is methylene chloride.

15. A process as claimed in 8, wherein the polar solvent is dimethylformamide.

16. A process as claimed in 8, wherein the inert atmosphere is provided by argon.

17. A process as claimed in 8, wherein the supported titanium compound is prepared at 20–50° C.

18. A process as claimed in claim 8, wherein the weight ratio of the titanium to polysulfone is 0.04:0.3.

19. A process for the polymerization of an olefin with a titanium catalyst comprising a titanium compound and an organoaluminium compound cocatalyst supported on a soluble polysulfone comprising free reactive sulfone groups, wherein the molar ratio of titanium to aluminium is 1–10:

200 and the weight ratio of titanium to polysulfone is 0.01:0.3–2.5, the process comprises reacting the olefin with the titanium catalyst under polymerization conditions.

20. A process as claimed in claim 19, wherein the polysulfone is of the formula 1:

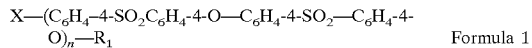

Formula 1 wherein X=Cl, $R_1$=H or $CH_3$ and n=25–30.

21. A process as claimed in claim 19, wherein the olefin is ethylene.

22. A process as claimed in claim 19, wherein the titanium compound is titanium tetrachloride and/or titanium tetrabutoxide.

23. A process as claimed in any one of claim 19, wherein the organoaluminium compound is methyl aluminoxane.

24. A process as claimed in claim 19, wherein the molar ratio of titanium to aluminium is 10:200.

25. A process as claimed in claim 19, wherein the weight ratio of the titanium to polysulfone is 0.3:0.04.

26. A process as claimed in claim 9, wherein $R_1$=$CH_3$, the halogenated or polar solvent comprises methylene dichloride, the titanium compound comprises titanium tetrachloride and the organoaluminium compound comprises methyl aluminoxane.

27. A process as claimed in claim 9, wherein $R_1$=H, the halogenated or polar solvent comprises methylene dichloride, the titanium compound comprises titanium tetrachloride and the organoaluminium compound comprises methyl aluminoxane.

28. A process as claimed in claim 9, wherein $R_1$=H, the halogenated or polar solvent comprises methylene dichloride, the titanium compound comprises titanium tetrabutoxide and the organoaluminium compound comprises methyl aluminoxane.

29. A process as claimed in claim 9, wherein $R_1$=$CH_3$, the halogenated or polar solvent comprises dimethyl formamide, the titanium compound comprises titanium tetrachloride and the organoaluminium compound comprises methyl aluminoxane.

30. A process as claimed in claim 20, wherein $R_1$=$CH_3$, the halogenated or polar solvent comprises methylene dichloride, the titanium compound comprises titanium tetrachloride and the organoaluminium compound comprises methyl aluminoxane.

31. A process as claimed in claim 20, wherein $R_1$=H, the halogenated or polar solvent comprises methylene dichloride, the titanium compound comprises titanium tet rachloride and the organoaluminium compound comprises methyl aluminoxane.

32. A process as claimed in claim 20, wherein $R_1$=H, the halogenated or polar solvent comprises methylene dichloride, the titanium compound comprises titanium tetrabutoxide and the organoaluminium compound comprises methyl aluminoxane.

33. A process as claimed in claim 20, wherein $R_1$=$CH_3$, the halogenated or polar solvent comprises dimethyl formamide, the titanium compound comprises titanium tetrachloride and the organoaluminium compound comprises methyl aluminoxane.

* * * * *

UNITED STATES PATENT AND TRADEMARK OFFICE
CERTIFICATE OF CORRECTION

PATENT NO. : 6,969,747 B2  
APPLICATION NO. : 10/502219  
DATED : November 29, 2005  
INVENTOR(S) : Bhaduri et al.

It is certified that error appears in the above-identified patent and that said Letters Patent is hereby corrected as shown below:

On the cover page, column 2 (Other Publications), line 3, delete "88," and insert --86--.

On the cover page, column 2 (Other Publications), line 13, delete "catalystys" and insert --catalysts--.

On the cover page, column 2 (Abstract), line 4, delete "of" and insert --to--.

At column 1, line 24-25, delete "heterogenous" and insert --heterogeneous--.

At column 1, line 38, delete "no" and insert --on--.

At column 1, line 39, delete "catalyst" and insert --catalysts--.

At column 1, line 53, delete "catalyst" and insert --catalysts--.

At column 2, line 51 (approx.), delete "catalyst" and insert --catalysts--.

At column 3, line 31, delete "aluminum" and insert --aluminum is--.

At column 3, line 32, after "polysulfone" insert --is--.

At column 3, line 54, after "titanium" delete "of" and insert --to--.

At column 3, line 54, delete "0.2:" and insert --0.1:--.

At column 4, line 10 (approx.), delete "1,2-dichloride" and insert --1,2-dichloroethane--.

At column 4, line 17 (approx.), delete "catalyst" and insert --catalysts--.

At column 4, line 46, delete "catalyst" and insert --catalysts--.

At column 5, line 23 (approx.), delete "Ti(OBU$^n$)$_4$" and insert --Ti(OBu$^n$)$_4$--.

At column 5, line 25, delete "D90 59.0μ." and insert --D90 59.9μ.--.

At column 6, line 54, in claim 15, delete "8," and insert --claim 8,--.

At column 6, line 56, in claim 16, delete "8," and insert --claim 8,--.

At column 6, line 58, in claim 17, delete "8," and insert --claim 8,--.

UNITED STATES PATENT AND TRADEMARK OFFICE
CERTIFICATE OF CORRECTION

PATENT NO. : 6,969,747 B2
APPLICATION NO. : 10/502219
DATED : November 29, 2005
INVENTOR(S) : Bhaduri et al.

It is certified that error appears in the above-identified patent and that said Letters Patent is hereby corrected as shown below:

At column 8, line 17-18, in claim 31, delete "tet rachloride" and insert --tetrachloride--.

Signed and Sealed this

Eighth Day of August, 2006

JON W. DUDAS
*Director of the United States Patent and Trademark Office*